(12) United States Patent
Imaizumi et al.

(10) Patent No.: US 7,689,824 B2
(45) Date of Patent: Mar. 30, 2010

(54) DATA MANAGEMENT APPARATUS, DATA MANAGEMENT SYSTEM, AND METHOD OF DATA MANAGEMENT

(75) Inventors: Shoji Imaizumi, Shinshiro (JP); Hiroshi Iwamoto, Toyohashi (JP); Masaaki Saka, Toyokawa (JP); Eiichi Yoshida, Toyokawa (JP); Hideki Hino, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1286 days.

(21) Appl. No.: 10/997,938

(22) Filed: Nov. 29, 2004

(65) Prior Publication Data
US 2006/0048234 A1 Mar. 2, 2006

(30) Foreign Application Priority Data
Aug. 31, 2004 (JP) ............................... 2004-252425

(51) Int. Cl.
*H04L 9/32* (2006.01)
(52) U.S. Cl. ..................................................... 713/169
(58) Field of Classification Search ........................ None
See application file for complete search history.

(56) References Cited

U.S. PATENT DOCUMENTS 7,350,075 B1 * 3/2008 Eastham ..................... 713/168

2005/0055573 A1 * 3/2005 Smith ......................... 713/201

FOREIGN PATENT DOCUMENTS

| JP | 2001-273180 A | 10/2001 |
| JP | 2003-067249 A | 3/2003 |

OTHER PUBLICATIONS

Japanese Office Action for Application No. 2004-252425, dated Aug. 28, 2007, and English translation thereof.

* cited by examiner

*Primary Examiner*—Brandon S Hoffman
(74) *Attorney, Agent, or Firm*—Buchanan Ingersoll & Rooney PC

(57) ABSTRACT

A data management system includes an authentication server and a data management apparatus (or an MFP). The authentication server includes a storage part for storing affiliation information specifying at least one group that each user belongs to, an authentication part for transferring and receiving data to and from the data management apparatus to perform user authentication, and a group identification part for identifying one or more groups that an authenticated user belongs to based on the affiliation information to send information about the one or more groups to the data management apparatus. An access permission part of the data management apparatus permits an authenticated user belonging to a plurality of groups to access a data file to which any of the plurality of groups has been granted access.

15 Claims, 17 Drawing Sheets

<Create New Section>
New Section Name : | Section SC2 |

| OK | | CANCEL |

<Create New Subsection>
New Subsection Name: | Subsection SS4 |

Section New Subsection Belongs To:

Section SC1
Section SC2

| OK | | CANCEL |

F I G . 7

<Register New User>

New User Name : User UR3

Name of Subsection
New User Belongs To

- Subsection SS1
- Subsection SS2
- Subsection SS3
- Subsection SS4

Name of Section
New User Belongs To

- Section SC1
- Section SC2

[OK] [CANCEL]

F I G . 8

<Select User To Be Modified>

User UR1

User UR2

User UR3

User UR4

[OK] [CANCEL]

F I G . 2 2
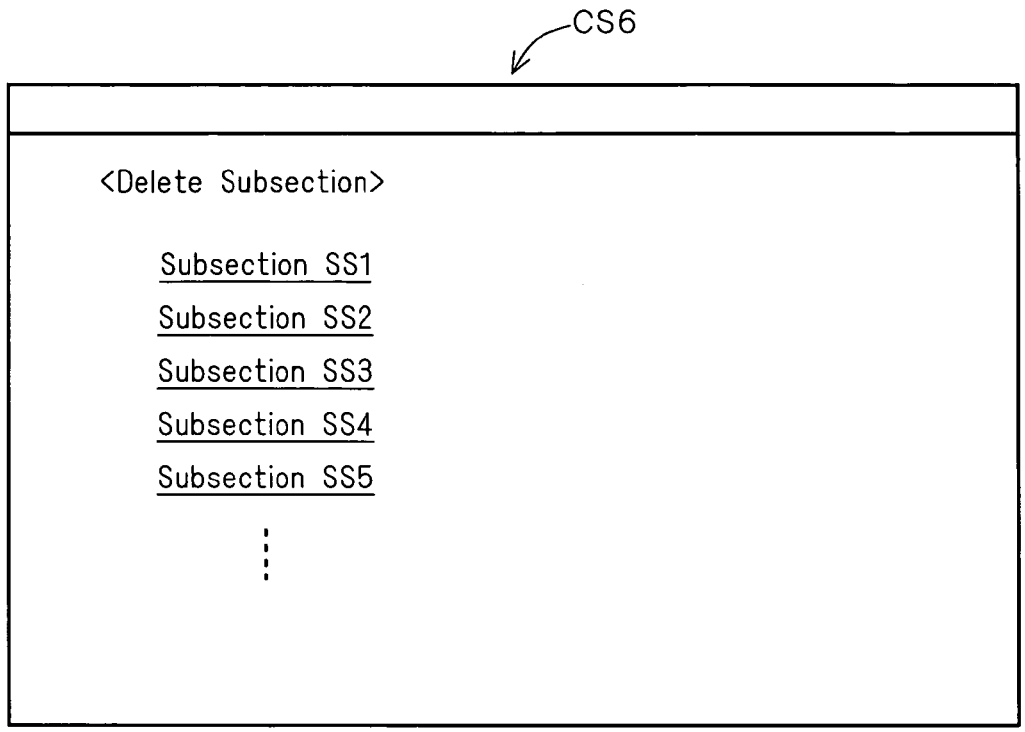
F I G . 2 3
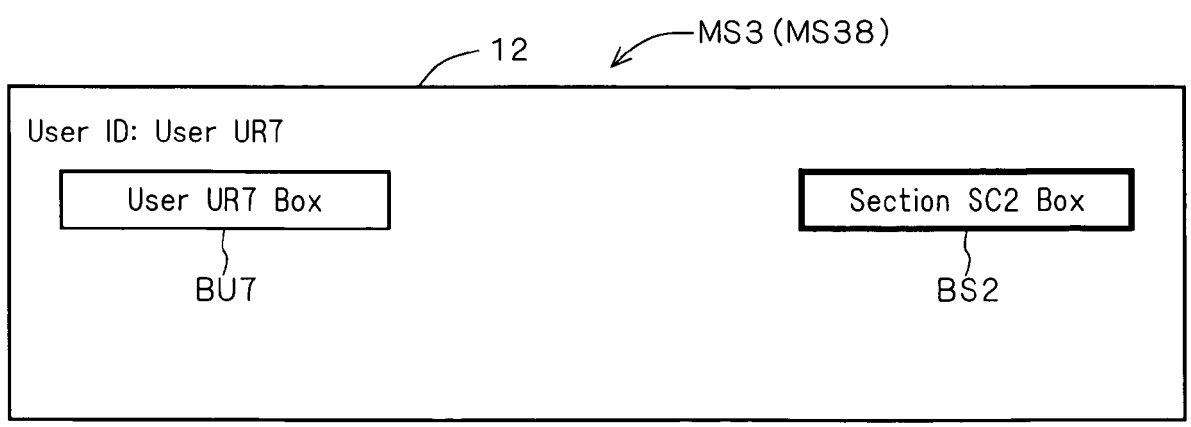

DATA MANAGEMENT APPARATUS, DATA MANAGEMENT SYSTEM, AND METHOD OF DATA MANAGEMENT

This application is based on application No. 2004-252425 filed in Japan, the contents of which are hereby incorporated by reference.

BACKGROUND OF THE INVENTION

1. Field of the Invention

The present invention relates to a data management apparatus such as a multifunction peripheral (referred to also as an MFP), and a technique related to the data management apparatus.

2. Description of the Background Art

Some multifunction peripherals (MFPs) having a plurality of functions including a copying function, a scanning function, a facsimile communication function, a printer function and the like also have the function (storage function) of storing various document files (data files) and the like in a storage part (hard disk and the like) thereof.

In recent years, it has been proposed to set the right of access to each of the document files for the use of such a storage function.

For example, Japanese Patent Application Laid-Open No. 2003-67249 specifies a technique such that the right of access to each document file is set for each user group.

The above-mentioned technique, however, requires an authentication operation for each of a plurality of data files when access is made to the plurality of data files. When users belonging to different groups make access to the plurality of data files to which the different groups have been granted access, it is therefore necessary to perform an authentication operation for each of the plurality of data files.

The technique disclosed in Japanese Patent Application Laid-Open No. 2003-67249 uses ID cards for the authentication operation. Without the use of the ID cards, however, a user must enter a user ID and a user password each time the authentication operation is performed for each data file. This presents the problem of increased operational burdens on the users.

The use of the ID cards as disclosed in Japanese Patent Application Laid-Open No. 2003-67249 eliminates the need for the above-mentioned entry of the user ID and the user password during the authentication operation to reduce the operational burdens, but gives rise to another problem that the users must carry their ID cards.

SUMMARY OF THE INVENTION

It is an object of the present invention to provide a data management technique which enables a user to more easily access a plurality of data files to which different groups that the user belongs to have been granted access.

To achieve the object, a data management system according to a first aspect of the present invention comprises: an authentication server; and at least one data management apparatus, the authentication server including an affiliation information storage element for storing affiliation information specifying at least one group that each user belongs to, a server-side authentication element for transferring and receiving data to and from the at least one data management apparatus to perform user authentication, and a group identification element for identifying one or more groups that a user authenticated by the server-side authentication element belongs to based on the affiliation information to send information about the one or more groups to the at least one data management apparatus, the at least one data management apparatus including a data file storage element for storing data files each in association with the right of access of groups to each data file, an apparatus-side authentication element for transferring and receiving data to and from the authentication server to perform user authentication, a receiving element for receiving from the authentication server the information about the one or more groups that the authenticated user belongs to, and an access permission element for permitting the authenticated user to access a data file to which any of the one or more groups that the authenticated user belongs to has been granted access, wherein the access permission element permits an authenticated user belonging to a plurality of groups to access a data file to which any of the plurality of groups has been granted access.

The data management system eliminates the need for individual user authentication operations for a plurality of data files to which different groups have been granted access. The data management system also eliminates the need for a user to carry an ID card for user authentication and the like. Therefore, the data management system enables the user to easily access the plurality of data files to which the different groups have been granted access.

The present invention is also intended for a data management apparatus and a method of data management.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a screen for creation of a new section;

FIG. 6 shows a screen for creation of a new subsection;

FIG. 7 shows a screen for registration of a new user;

FIG. 8 shows a screen for selection of a user to be modified;

FIG. 22 shows a screen for operation during the deletion of subsections;

FIG. 23 shows a screen displayed during user reauthentication after the subsection deletion operation.

DESCRIPTION OF THE PREFERRED EMBODIMENTS

A preferred embodiment according to the present invention will now be described with reference to the drawings.

<A1. Overall Construction>

Figure 1:
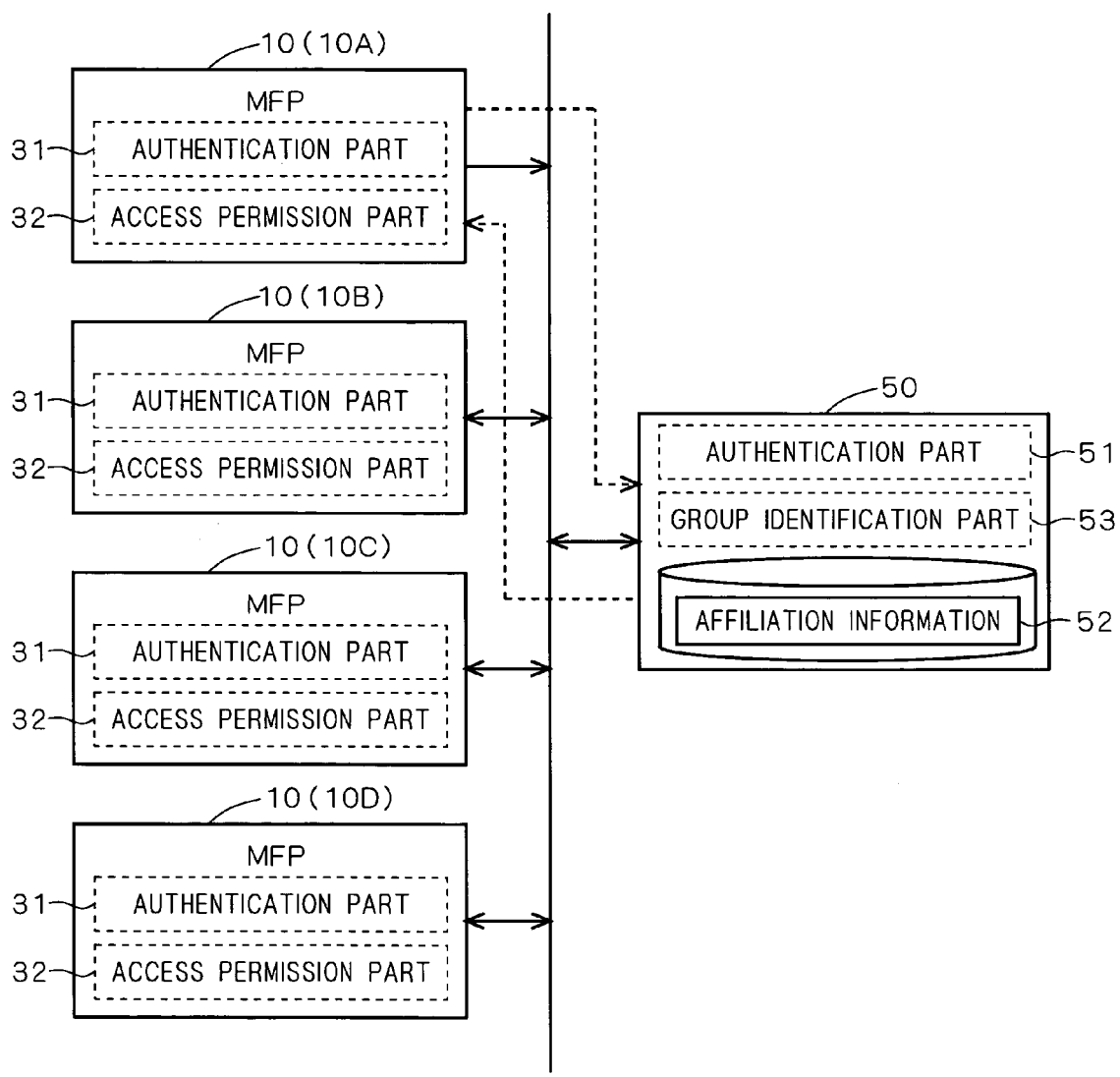
FIG. 1 is a schematic diagram showing the overall construction of a data management system.

FIG. 1 is a schematic diagram showing the overall construction of a data management system 1A according to the preferred embodiment of the present invention. The system 1A comprises a plurality of multifunction peripherals (abbreviated hereinafter as "MFPs") 10 and an authentication server 50.

Each of the MFPs 10 is a multifunction machine having a plurality of functions including a scanning function, a copying function, a printer function, a facsimile communication function, an image storage function and the like. Thus, each MFP 10 may be described as an image formation apparatus having the function of forming images and the like. Each MFP 10 may also be described as an apparatus for managing (or storing) data about images and the like, that is, as a data management apparatus (or a data storage apparatus).

The authentication server 50 transfers and receives data about authentication to and from the MFPs 10. By transferring and receiving the data about authentication to and from the authentication server 50, each MFP 10 can determine whether to permit a user to use the apparatus (i.e., each MFP 10 itself) or not, that is, perform user authentication.

The MFPs 10 and the authentication server 50 are connected to a network NW, and are capable of sending and receiving various data to and from each other through the network NW. The "network" used herein refers to a communication network for data communication and, more specifically, includes a variety of communication networks constructed by electric telecommunication lines (including optical communication lines). The connection to the network may be either a constant connection using a dedicated line or a temporary connection such as a dial-up connection using a public telephone line including an analog line and a digital line (ISDN). The transmission system may be either wireless or wired.

<A2. Detailed Construction of MFP 10 etc.>

Figure 2:
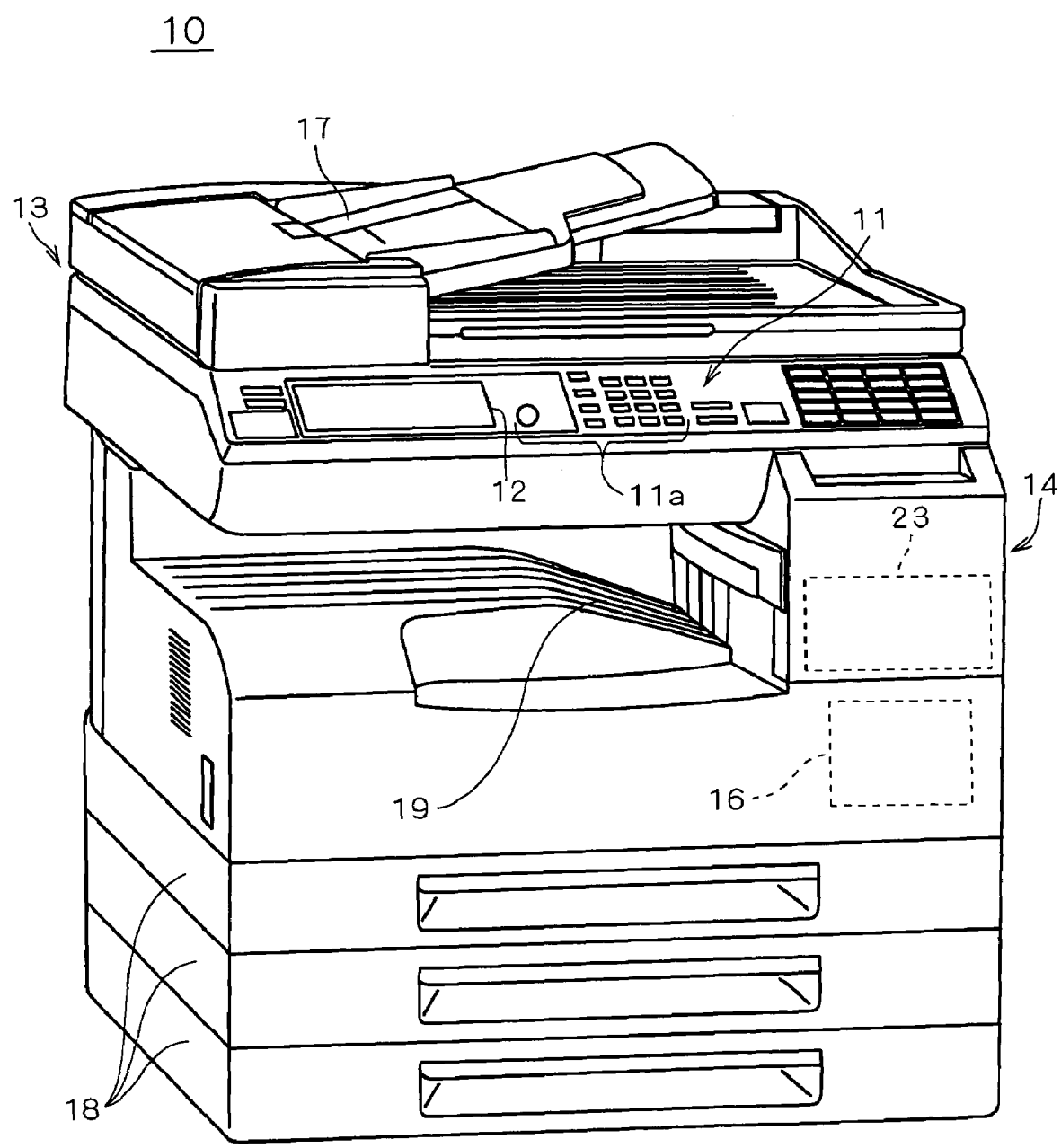
FIG. 2 is an external view of an MFP (multifunction peripheral)

FIG. 2 is an external view of the MFP 10.

As shown in FIG. 2, the MFP 10 comprises: a manual control part 11 including a plurality of keys 11a, and accepting various instructions given by a user manipulating the keys 11a and the input of data including characters, numerals and the like; a display 12 for displaying an instruction menu for the user, information about acquired images, and the like; a scanner part 13 for photoelectrically reading an original to provide image data; and a printer part 14 for printing an image on a recording sheet based on the image data.

The MFP 10 further comprises: a feeder part 17 on an upper surface of the body thereof for feeding an original to the scanner part 13; paper feeding parts 18 in a lower portion thereof for feeding a recording sheet to the printer part 14; a tray 19 in a central portion thereof for receiving the ejected recording sheet with an image printed thereon by the printer part 14; a communication part 16 inside the body thereof for transferring and receiving the image data to and from external equipment through the network; and a storage part 23 inside the body thereof for storing the image data and the like. Although not shown, the MFP 10 has a network interface, and the communication part 16 is connected through the network interface to the network so that various data are transferred between the communication part 16 and the external equipment.

The display 12 is used to produce various displays including a display for authentication, and the manual control part 11 is used for various inputs including the selection of various functions. The display 12 is configured as a liquid crystal panel with a contact sensor or the like incorporated therein for detecting a position where a finger of an operator touches the display 12. Thus, the operator presses various virtual buttons and the like displayed within the display 12 with his/her finger and the like to input various instructions. The display 12 also has such a manual input function. The manual control part 11 and the display 12 function as principal parts of a user interface.

The scanner part 13 photoelectrically reads image information about photographs, characters, pictures and the like from the original to acquire image data. An image processor not shown converts the image data (or density data) acquired by the scanner part 13 into digital data to perform various known image processing on the digital data. The processed digital data is sent to the printer part 14 and the communication part 16 for image printing and for data transmission, or is stored in the storage part 23 for future use.

The printer part 14 prints an image on a recording sheet, based on the image data acquired by the scanner part 13, the image data received from external equipment through the communication part 16, or the image data stored in the storage part 23. Thus, the printer part 14 serves as a print output part for providing various print outputs.

The communication part 16 sends and receives various data through the network such as a LAN and the Internet to and from external equipment connected to the network. The communication part 16 also sends and receives facsimile data through the public telephone line.

Figure 3:
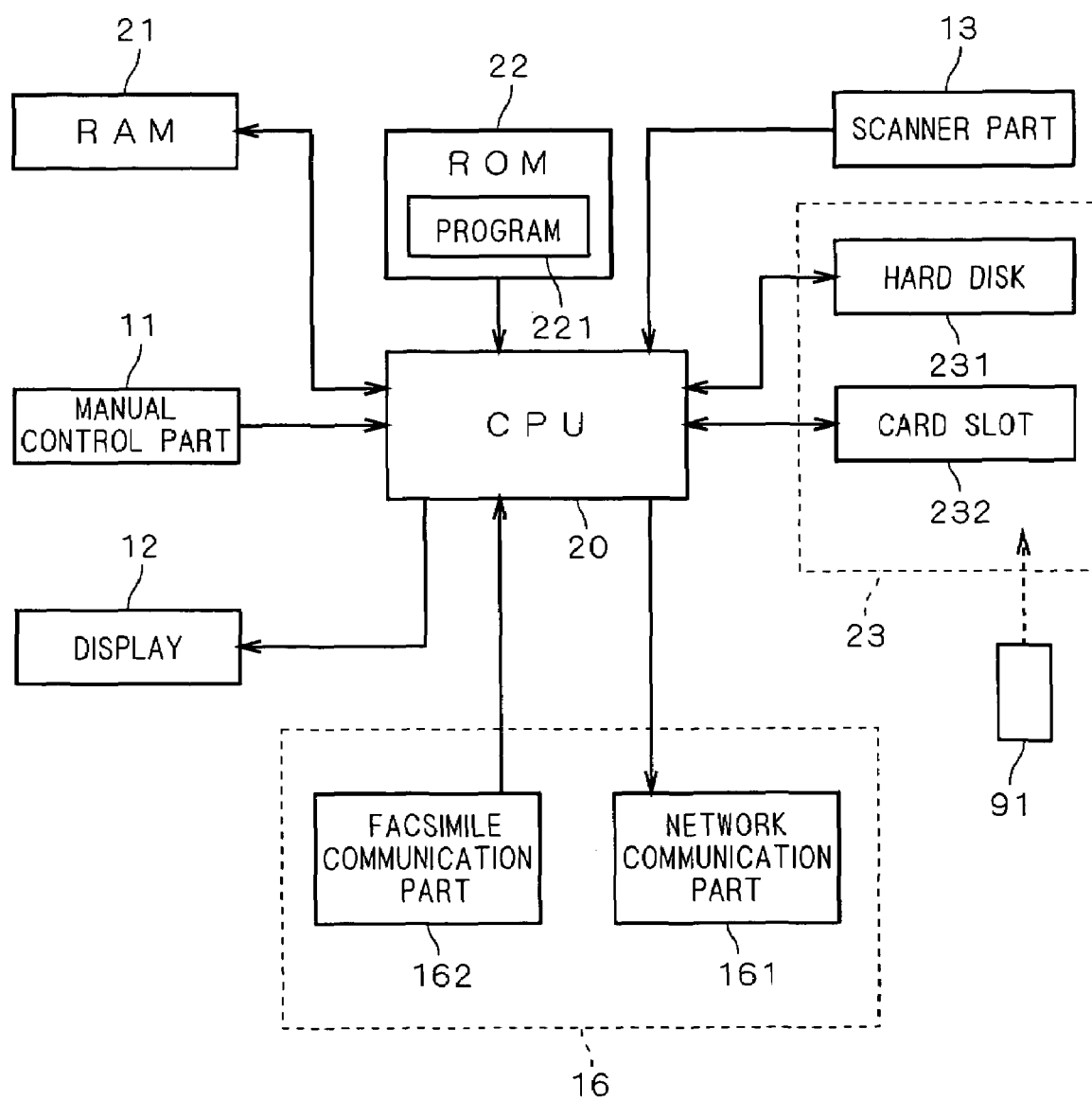
FIG. 3 is a block diagram showing the construction of the MFP.

FIG. 3 is a block diagram showing principal components of the MFP 10 according to the preferred embodiment. The MFP 10 includes a CPU 20 for performing various computation processes and for controlling the entire operation of the MFP 10. A RAM 21 for storing various data therein, and a ROM 22 for storing a predetermined software program (hereinafter referred to simply as a "program") 221 therein are connected to the CPU 20. The manual control part 11, the display 12, the scanner part 13, the storage part 23, and the like are also connected to the CPU 20. The storage part 23 includes a hard disk 231 for holding the image data and the like therein, and a card slot 232 for reading information from a memory card 91. The RAM 21 is a nonvolatile RAM.

This allows the transfer of various data between the RAM 21, the scanner part 13, the hard disk 231, and the memory card 91 inserted in the card slot 232 under the control of the CPU 20, and produces the display of information stored in the RAM 21, the hard disk 231, and the memory card 91 on the display 12 under the control of the CPU 20.

The communication part 16 is also connected to the CPU 20. The communication part 16 includes a network communication part 161 (FIG. 3) for sending and receiving the various data through the network such as a LAN and the Internet to and from external equipment connected to the network, and a facsimile communication part 162 (FIG. 3) for sending and receiving the facsimile data through the public telephone line.

As illustrated in FIG. 1, the MFP 10 further includes an authentication part 31, an access permission part 32 and the like. These parts are processing parts implemented functionally by the execution of the program 221 using hardware resources including the above-mentioned CPU 20, RAM 21, ROM 22, storage part 23 and the like. The authentication part 31 transfers and receives data to and from the authentication server 50, thereby to perform user authentication. The access permission part 32 determines whether to permit the user authenticated by the authentication part 31 to make access to data files or not.

As described above, the MFP 10 has the function of storing data files about images and the like in the storage part 23 including the hard disk 231 as the image storage function.

Each of the stored data files is associated with the right of access of each group (to be described later).

The MFP 10 transfers and receives data to and from the authentication server 50 to perform user authentication, and determines whether to permit the authenticated user to make access to data files or not. In other words, the MFP 10 determines the permission for access to each data file and the like by the use of a result of authentication from the authentication server 50 and a result of identification of affiliation information.

To this end, the authentication server 50 stores user authentication data, and uses the user authentication data to perform user authentication about a user about which an inquiry is made in response to an inquiry request from the MFP 10. This user authentication is performed by an authentication part 51 (FIG. 1) of the authentication server 50.

After the user authentication, the authentication server 50 identifies a group that the authenticated user belongs to, based on "affiliation information" (to be described later) stored in an affiliation information storage part 52 (FIG. 1) of the authentication server 50, to send back the identification result to the MFP 10. Such an identification operation or the like is performed by a group identification part 53 (FIG. 1).

Upon receipt of the above-mentioned identification result from the authentication server 50, the MFP 10 permits access to all data files to which a group that the authenticated user belongs to has been granted access, in response to the received result.

The term "granted access to" used herein not only means that all types of access rights such as display (browse), printing, deletion and the like are authorized, but also includes a case where at least one of the access rights is authorized among these various functions.

As described above, the data management system 1A uses the authentication server 50 to perform the user authentication operation, and identifies the group to which the authenticated user belongs to simultaneously permit access to all data files to which the identified group has been granted access. This eliminates the need to perform the authentication operation for each data file. In particular, if a user belongs to a plurality of groups, there is no need to perform the authentication operation for each of the data files to which only an individual one of the plurality of groups has been granted access. Therefore, the user can more easily access a plurality of data files to which different groups that the user belongs to have been granted access.

The various operations and the like in the data management system 1A will be described in further detail.

<A3. Registration of User Authentication Information on Authentication Server 50>

The operation of registering user authentication information on the authentication server 50 will be described.

Information (or user authentication information) about a user ID and a user password for the user ID which are associated with each other is stored in the authentication server 50. For example, a user ID "yoshida" and a user password "xyss1556" therefor are stored in association with each other. Similarly, a plurality of user IDs and a plurality of user passwords are stored in one-to-one corresponding relationship.

Such an operation of registering the user authentication information on the authentication server 50 is performed principally by an administrator of the entire system.

<A4. Registration of Affiliation Information on Authentication Server 50>

Next, the operation of registering the affiliation information on the authentication server 50 will be described.

Figure 4:
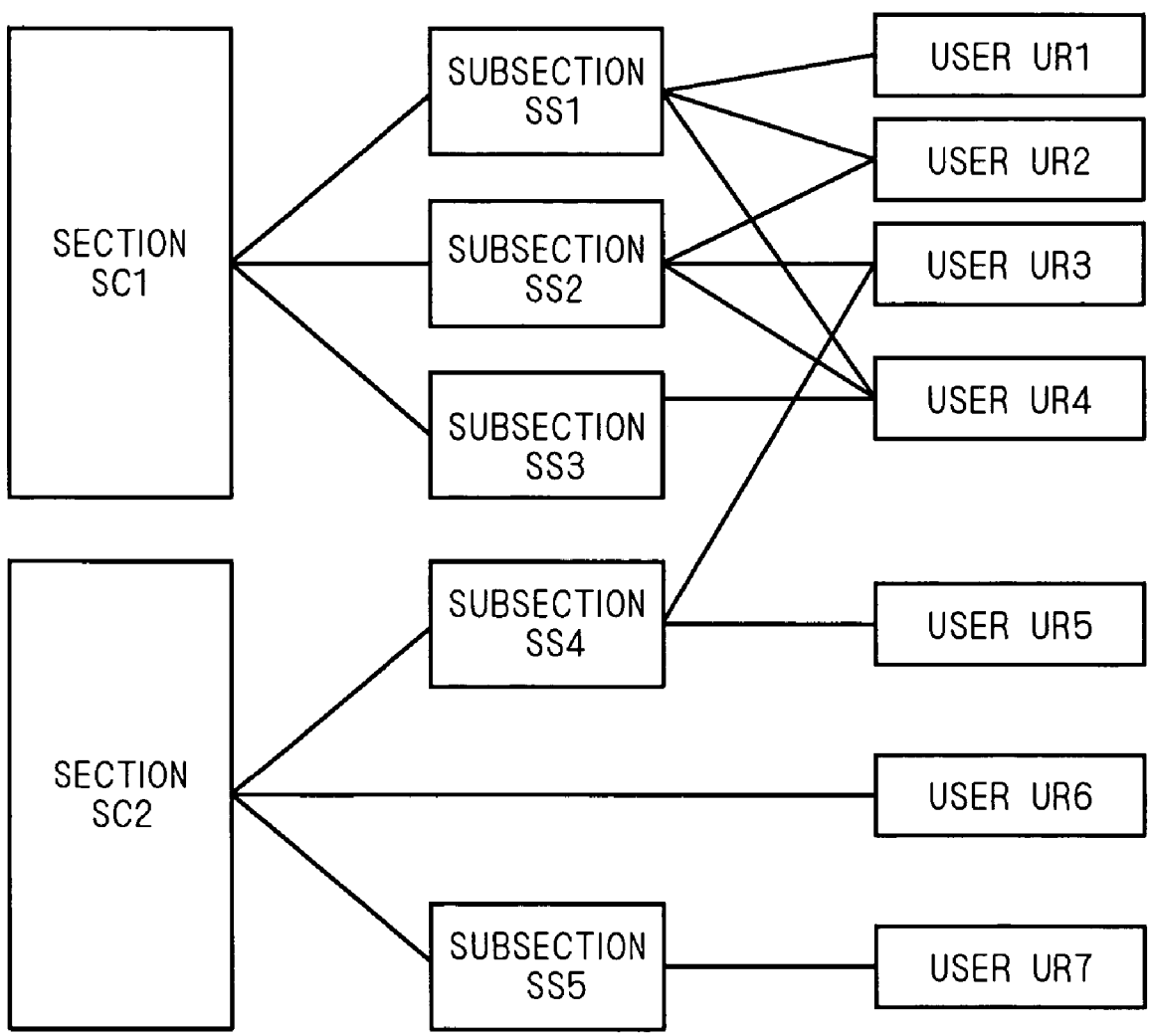
FIG. 4 is a conceptual diagram of "affiliation information" stored in an authentication server.

FIG. 4 is a conceptual diagram of the "affiliation information" stored in the authentication server 50. The "affiliation information" is actually stored in suitable data format having a tree structure and the like.

The "affiliation information" is information specifying to which group each user belongs among a plurality of groups. In other words, the "affiliation information" is information specifying one or more groups that each user belongs to.

The "groups" illustrated herein are arranged to form a multilevel hierarchy including first-level groups (subsections SS1 to SS5, etc.) and second-level groups (sections SC1, SC2, etc.) higher in level than the first-level groups.

Specifically, with reference to FIG. 4, a user UR1 belongs to the subsection SS1, and a user UR2 belongs to the two subsections SS1 and SS2. A user UR3 belongs to the two subsections SS2 and SS4, and a user UR4 belongs to the three subsections SS1, SS2 and SS3. A user UR5 belongs to the subsection SS4, and a user UR7 belongs to the subsection SS5. A user UR6 belongs to no first-level groups, but belongs to the second-level group or section SC2.

The subsections SS1, SS2 and SS3 belong to the section SC1, and the subsections SS4 and SS5 belong to the section SC2.

Consequently, the user UR1 belongs to the two groups at different levels, i.e. the subsection SS1 and the section SC1. The user UR2 belongs to the subsections SS1, SS2 and the section SC1. The user UR3 belongs to the subsection SS4 and the section SC2 in addition to the subsection SS2 and the section SC1.

Likewise, the user UR4 belongs to the subsections SS1, SS2, SS3 and the section SC1. The user UR5 belongs to the subsection SS4 and the section SC2. The user UR7 belongs to the subsection SS5 and the section SC2.

Each user is permitted to access a data file to which a group that each user belongs to has been granted access, as will be described later. Thus, the authentication server 50 performs user authentication for an objective user in response to an authentication request from an MFP 10 from which an inquiry is received, and identifies the group that the objective user belongs to, based on the "affiliation information," to send back the identification result to the MFP 10 from which the inquiry is received.

The operation of registering the "affiliation information" on the authentication server 50 is principally performed by the administrator of the entire system using display screens (see FIGS. 5 to 9) of the authentication server 50. The operations of registering a new section, registering a new subsection and registering a new user will be described in order.

First, the operation of registering a new section will be described.

FIG. 5 shows a screen CS1 for creation of a new section. Using the screen SC1 as shown in FIG. 5, an operator enters the name of a new section (or a new section name). The "section SC2" is illustrated as newly registered in FIG. 5.

In response to such an entry, the authentication server 50 newly creates and registers the "section SC2."

The authentication server 50 also sends a notification to an MFP 10 to notify the MFP 10 to create a box for the section SC2. More specifically, the authentication server 50 sends this notification to an MFP 10 specified by the system administrator among a plurality of MFPs 10A to 10D. The MFP 10 (e.g., the MFP 10A) having received the notification creates the "box for the section SC2" such that all users belonging to the "section SC2" are permitted to access the data stored in this box. The present invention, however, is not limited to this. The operation of registering a box for a new section on each MFP 10 may be performed separately from the operation of registering the new section on the authentication server 50.

All of the users belonging to the section SC2 will have the right of access to all data files stored in the box for the section SC2. The term "box" used herein refers to a classified storage area similar in functionality to storage areas known as directories, folders and the like.

Next, the operation of registering a new subsection will be described.

FIG. 6 shows a screen CS2 for creation of a new subsection. Using the screen CS2 as shown in FIG. 6, an operator enters the name of a new subsection (or a new subsection name). The "subsection SS4" is illustrated as newly registered in FIG. 6.

In response to such an entry, the authentication server 50 newly creates and registers the "subsection SS4."

The authentication server 50 also sends a notification to an MFP 10 to notify the MFP 10 to create a box for the subsection SS4. More specifically, the authentication server 50 sends this notification to an MFP 10 specified by the system administrator among the plurality of MFPs 10A to 10D. The MFP 10 (e.g., the MFP 10A) having received the notification creates the "box for the subsection SS4" such that all users belonging to the "subsection SS4" are permitted to access the data stored in this box. The present invention, however, is not limited to this. The operation of registering a box for a new subsection on each MFP 10 may be performed separately from the operation of registering the new subsection on the authentication server 50.

All of the users belonging to the subsection SS4 will have the right of access to all data files stored in the box for the subsection SS4. In principle, a user who does not belong to the subsection SS4 does not have the right of access to the data files stored in the box for the subsection SS4.

As shown on the screen CS2 of FIG. 6, the section that the subsection SS4 belongs to is registered. Specifically, an operator performs a manual operation such as a mouse click to highlight a choice to be selected as a section that the subsection SS4 belongs to among the plurality of sections SC1 and SC2 so that the choice is currently selected. The section SC2 is illustrated as selected among the plurality of sections SC1 and SC2 in FIG. 6.

By performing the above-mentioned registration operation, the belonging relationship (see FIG. 4) between the subsection SS4 and the section SC2 is registered and stored in the authentication server 50.

Next, the operation of registering a new user will be described.

FIG. 7 shows a screen CS3 for registration of a new user. Using the screen CS3 as shown in FIG. 7, an operator enters the name of a new user (or a new user name). The "user UR3" is illustrated as newly registered in FIG. 7.

In response to such an entry, the authentication server 50 newly creates and registers the "user UR3."

The authentication server 50 also sends a notification to an MFP 10 to notify the MFP 10 to create a box dedicated to the user UR3. More specifically, the authentication server 50 sends this notification to an MFP 10 specified by the system administrator among the plurality of MFPs 10A to 10D. The MFP 10 (e.g., the MFP 10A) having received the notification creates the "box dedicated to the user UR3" such that the user UR3 is permitted to access the data stored in this box. The present invention, however, is not limited to this. The operation of registering a box for a new user on each MFP 10 may be performed separately from the operation of registering the new user on the authentication server 50.

The user UR3 will have the right of access to all data files stored in the box dedicated to the user UR3. In principle, a person other than the user UR3 does not have the right of access to the data files stored in the box dedicated to the user UR3.

As shown on the screen CS3 of FIG. 7, the subsection and section that the user UR3 belongs to are registered. Specifically, an operator performs a manual operation such as a mouse click to highlight a choice to be selected as a subsection that the user UR3 belongs to among the plurality of subsections SS1, SS2, SS3, SS4, etc. so that the choice is being selected. The two subsections SS2 and SS4 are illustrated as selected among the plurality of subsections SS1, SS2, SS3, SS4, etc. in FIG. 7.

In this process, when the subsection S52 is selected, the section SC1 that the subsection SS2 belongs to is automatically selected as a section that the user UR3 belongs to, based on the registration shown in FIG. 6 The section SC1 is also shown as highlighted in FIG. 7.

Similarly, when the subsection SS4 is selected, the section SC2 that the subsection SS4 belongs to is automatically selected as a section that the user UR3 belongs to, based on the registration shown in FIG. 6 The section SC2 is also shown as highlighted in FIG. 7.

By performing the above-mentioned registration operation, information indicating that the user UR3 belongs to the subsections SS2 and SS4 and to the sections SC1 and SC2 is registered and stored in the authentication server 50.

A section that a user belongs to may be set independently of a subsection that the user belongs to. For example, if only the section SC2 is registered as a group that the user UR6 belongs to (see FIG. 4), no subsections SS1 to SS5 are required to be selected, but the section SC2 may be directly selected as a section that the user UR6 belongs to on the screen CS3 shown in FIG. 7.

Next, the operation of modifying the registered information will be described.

Figure 9:
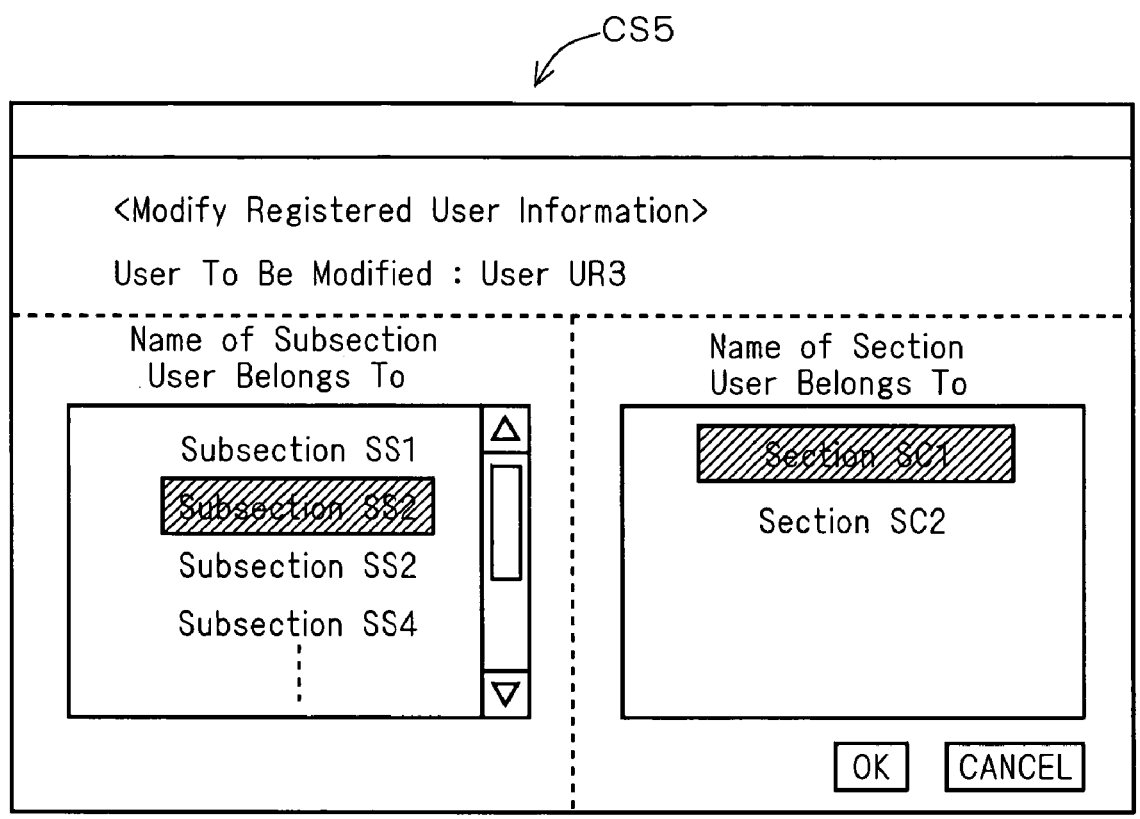
FIG. 9 shows a screen for modification.

The operation of modifying the registered user information may be performed using a screen shown, for example, in FIGS. 8 and 9. Specifically, an operator performs a manual operation such as a mouse click to select a desired name among a plurality of user names listed on a to-be-modified user selection screen CS4 as shown in FIG. 8, a modification screen CS5 as shown in FIG. 9 appears. Using such a modification screen CS5, modifications may be made to a relationship between a user to be modified and a subsection that the user belongs to and a relationship between the user to be modified and a section that the user belongs to.

Similarly, a relationship between the subsections SS1 to SS6 and the sections SC1 and SC2 at the higher level may be modified using a screen similar to that shown in FIG. 6 and the like.

Thus, modifications to the affiliation information are achieved by modifying the information in the authentication server 50. It is hence convenient for the operator to make such modifications. Therefore, the data management system 1A can easily respond to organizational changes.

In particular, automatic registration using a belonging relationship in an organizational chart allows modifications to be made more easily to the limits of accessible data files. For instance, if the user UR1 having belonged directly to only the subsection SS1 is to belong additionally to the subsection SS4, the addition of the subsection SS4 as a group that the user UR1 belongs to automatically causes the addition of the section SC2 to the groups that the user UR1 belongs to. As a result, the user UR1 can access the data files to which the subsection SS4 and the section SC2 have been granted access in addition to the data files to which the subsection SS1 and the section SC1 have been granted access.

<A5. Setting of Right of Access to Data Files>

Next, the setting of the right of access to data files will be described.

In the MFP 10, various data files including the image data acquired by the scanner part 13, the image data received from external equipment through the communication part 16, and the like are stored in the storage part 23.

The storage part 23 is provided with a plurality of boxes corresponding to the plurality of groups, respectively. The plurality of boxes are arranged to form a multilevel hierarchy in accordance with the hierarchy of the plurality of groups. Specifically, the total number of boxes provided in the storage part 23 is 14: two boxes for sections, five boxes for subsections and seven boxes dedicated to users.

For the storage of a data file in the storage part 23, a box serving as the storage location of the data file is specified, and the data file is stored in the specified box. Specifically, any of the boxes for the sections, the boxes for the subsections and the boxes dedicated to the users is specified as a box serving as the storage location.

A data file stored in a predetermined box is regarded as a data file to which a group corresponding to the predetermined box has been granted access.

For example, when a data file is stored in the box for the section SC2, the right of access to the data file is set for all users belonging to the section SC2 (that is, all users belonging to the section SC2 are granted access to the data file). When a data file is stored in the box for the subsection SS4, the right of access to the data file is set for all users belonging to the subsection SS4 (that is, all users belonging to the subsection SS4 are granted access to the data file). When a data file is stored in the box dedicated to the user UR3, the right of access to the data file is set for only the user UR3 (that is, only the user UR3 is granted access to the data file).

Thus, a data file is stored in association with the right of access of each group to the data file. In other words, a box is a storage area to which a member of a corresponding group has been granted access, and a data file stored in the box may also be described as data to which a member of a group corresponding to the box has been granted access. For example, the box for the subsection SS2 is a storage area to which a member of the subsection SS2 (i.e., the corresponding group) has been granted access, and a data file stored in the box for the subsection SS2 is data to which a member of the subsection SS2 (i.e., the corresponding group) has been granted access.

The above-mentioned boxes may be used to the storage of a document for circulation and the like for the respective groups. More specifically, a document for circulation within a section is stored in the box for the section, and a document for circulation within a subsection is stored in the box for the subsection. A user belonging to the subsection or the section can use the corresponding box to browse the document for circulation in the corresponding box.

Further, because the plurality of boxes are arranged to form the multilevel hierarchy as described above, various data files may be classified and stored depending on their disclosure levels (or secret levels).

Although the right of access to each data file is illustrated herein as set on a box-by-box basis in a comprehensive manner, the present invention is not limited to this. The right of access to each data file may be set individually per data file.

<A6. Process of Accessing Data Files>

Figure 10:
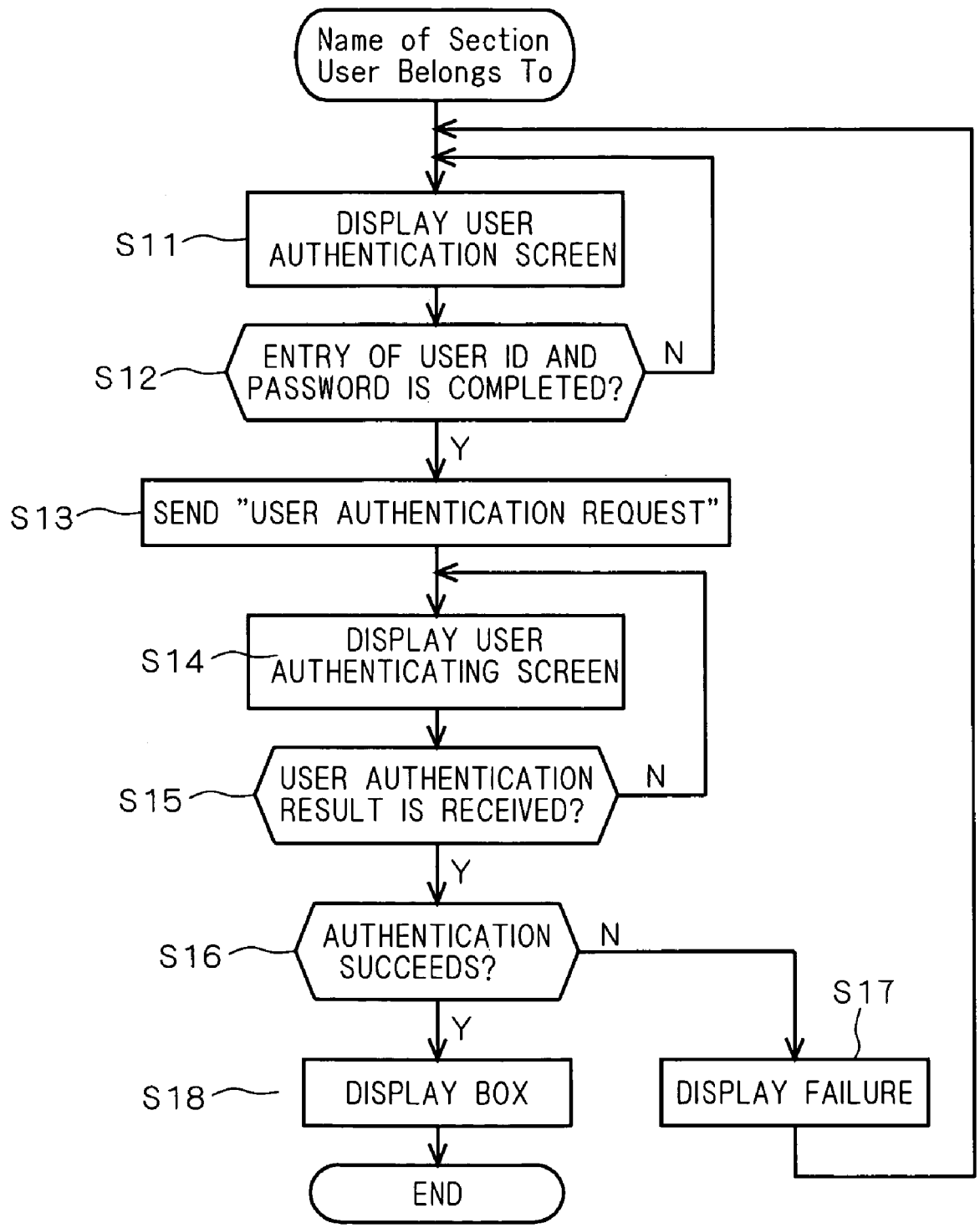
FIG. 10 is a flow chart showing a process in the MFP.
Figure 11:
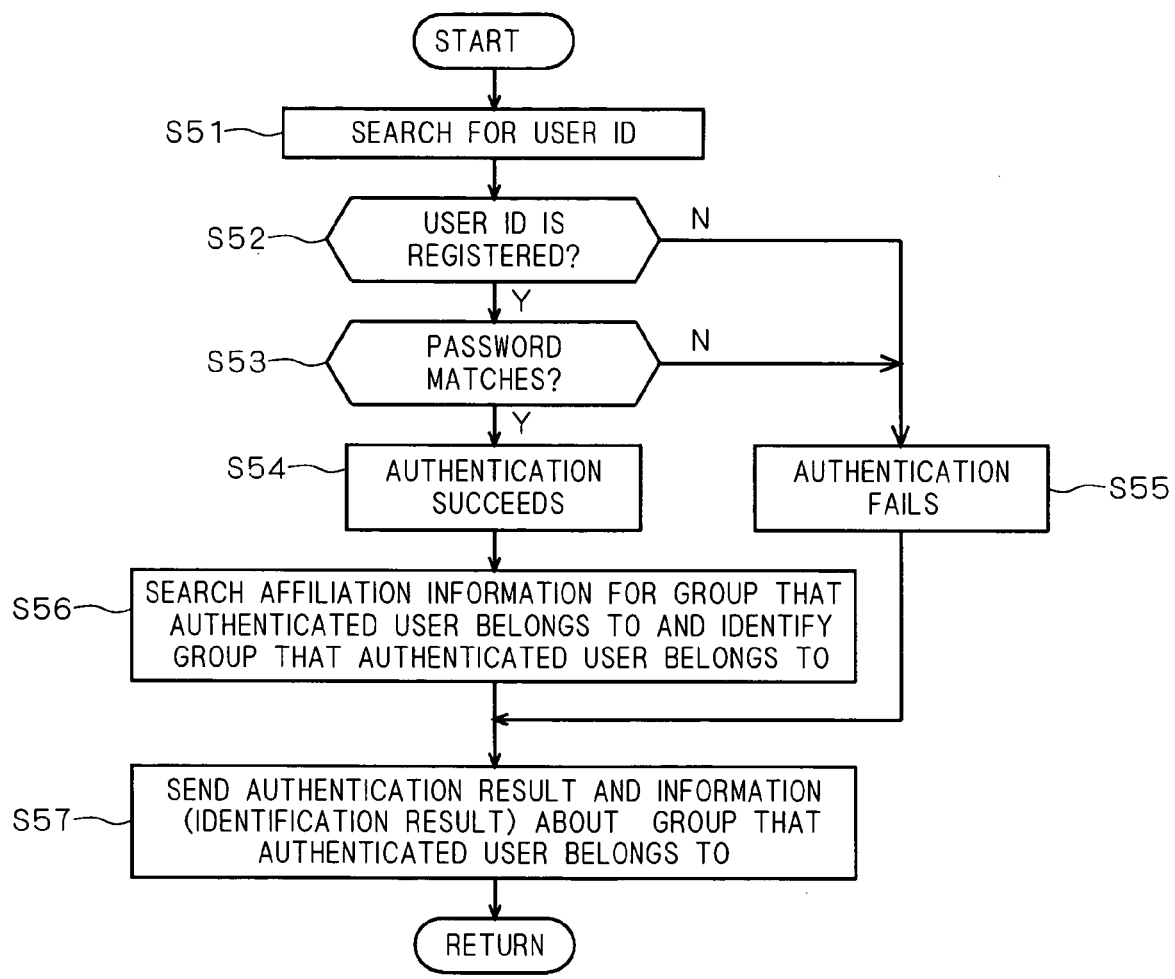
FIG. 11 is a flow chart showing a process in the authentication server.

The process of accessing the above-mentioned data files will be described with reference to FIGS. 10 and 11. It is assumed herein that a general user other than the system administrator is an operator who operates the MFP 10 (more particularly, the MFP 10A) to access a data file in the MFP 10 (10A). FIG. 10 is a flow chart showing the process in the MFP 10, and FIG. 11 is a flow chart showing the process in the authentication server 50.

First, in Step S11, the MFP 10 displays a user authentication screen MS1 (see FIG. 12) on the display 12 to accept the entry of a user ID (user name) and a user password.

Figure 12:
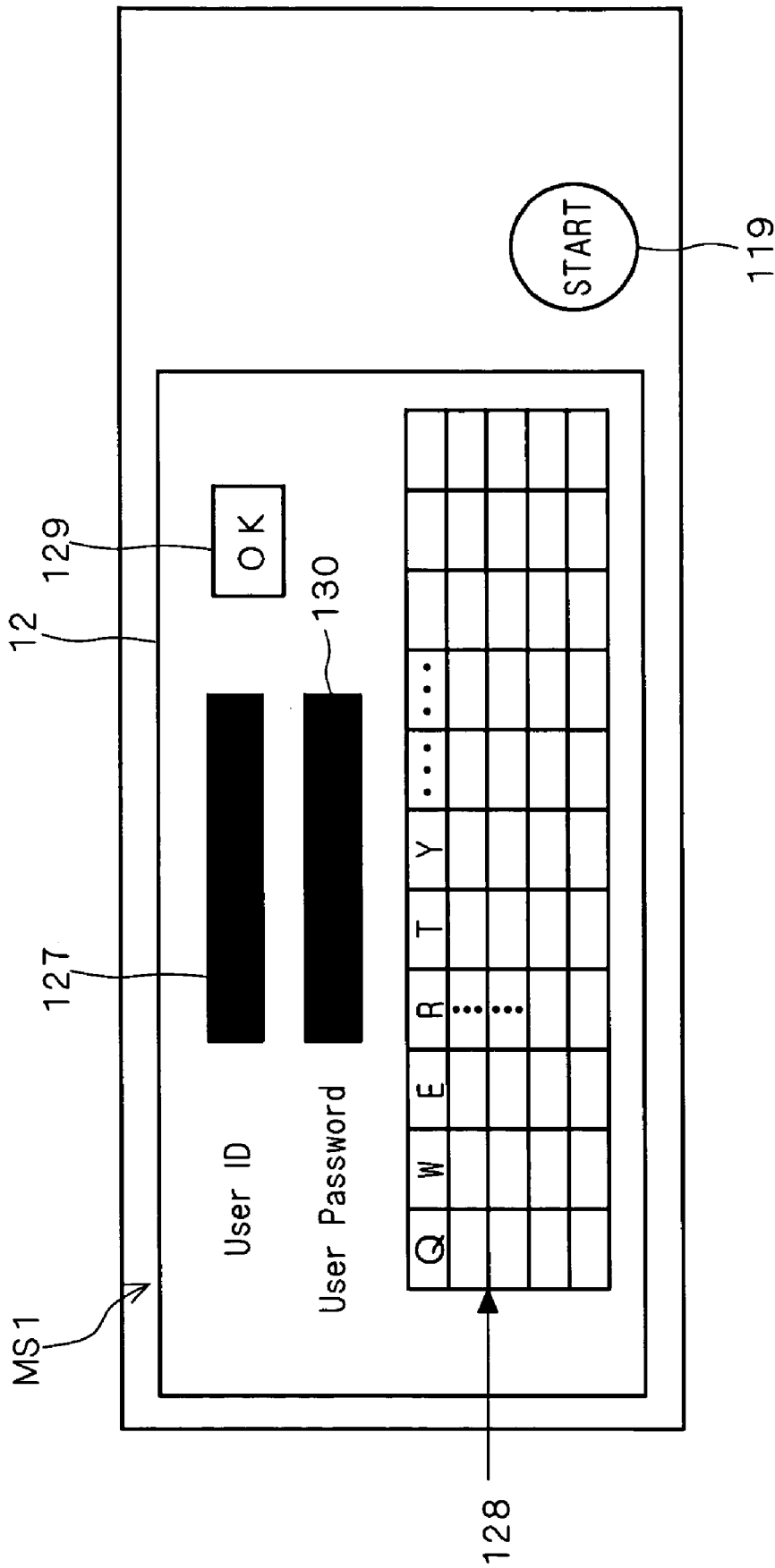
FIG. 12 shows a screen for user authentication.

FIG. 12 shows the user authentication screen MS1 for use in the user authentication operation. The screen MS1 contains a software keyboard 128, an OK button 129, a user ID entry box 127, and a user password entry box 130.

The user enters the user ID in the user ID entry box 127 by using the software keyboard 128. Thereafter, the user touches the user password entry box 130 with his/her finger so that the user password entry box 130 is currently selected, and enters the user password in the user password entry box 130 by using the software keyboard 128. The user finally presses the OK button 129.

After the verification of the completion of the entry of the user ID and the user password in Step S12 (FIG. 7), the processing proceeds to Step S13.

In Step S13, the MFP 10 sends a "user authentication request" to the authentication server 50. The "user authentication request" includes user information to be authenticated (specifically, the entered user ID and the entered user password) in addition to instruction data for requesting user authentication. The IP address (e.g., 192.168.0.10) of the authentication server 50 is stored in the MFP 10, and the MFP 10 determines the authentication server 50, based on the IP address.

Upon receipt of the "user authentication request," the authentication server 50 performs the authentication operation. The authentication server 50 verifies the entered user ID and the entered user password which are sent from the MFP 10 against the user authentication information stored in the authentication server 50 to judge whether or not the operator is a normal user (i.e., an authorized user).

Specifically, as shown in FIG. 11, the authentication server 50 searches a data table containing the user authentication information for the entered user ID (in Step S51). When the authentication server 50 verifies that the entered user ID is stored in the user authentication information (in Step S52) and verifies that the entered user password matches a corresponding password included in the user authentication information (in Step S53), the authentication server 50 judges that the authentication succeeds (in Step S54), and the processing proceeds to Step S56. Otherwise, the authentication server 50 judges that the authentication fails (in Step S55), and the processing proceeds to Step S57.

When the authentication server 50 judges the authentication succeeds, the authentication server 50 then identifies a group that the authenticated user belongs to, based on the affiliation information (see FIG. 4), in Step S56. For example, when the user authentication succeeds for the user UR3 identified by the entered user ID, a group that the user UR3 belongs to is identified. Specifically, the subsections SS2, SS4 and the sections SC1, SC2 are identified as groups that the user UR3 belongs to. The identified information (or identification result) is sent back in the next Step S57.

In Step S57, the authentication server 50 sends back to the MFP 10 the user authentication result and the identification result regarding the group that the authenticated user belongs to. When it is verified that the user authentication fails in Step S55, only the user authentication result indicating that the authentication fails is sent back to the MFP 10.

Referring again to FIG. 10, the process in the MFP 10 will be described.

Figure 13:
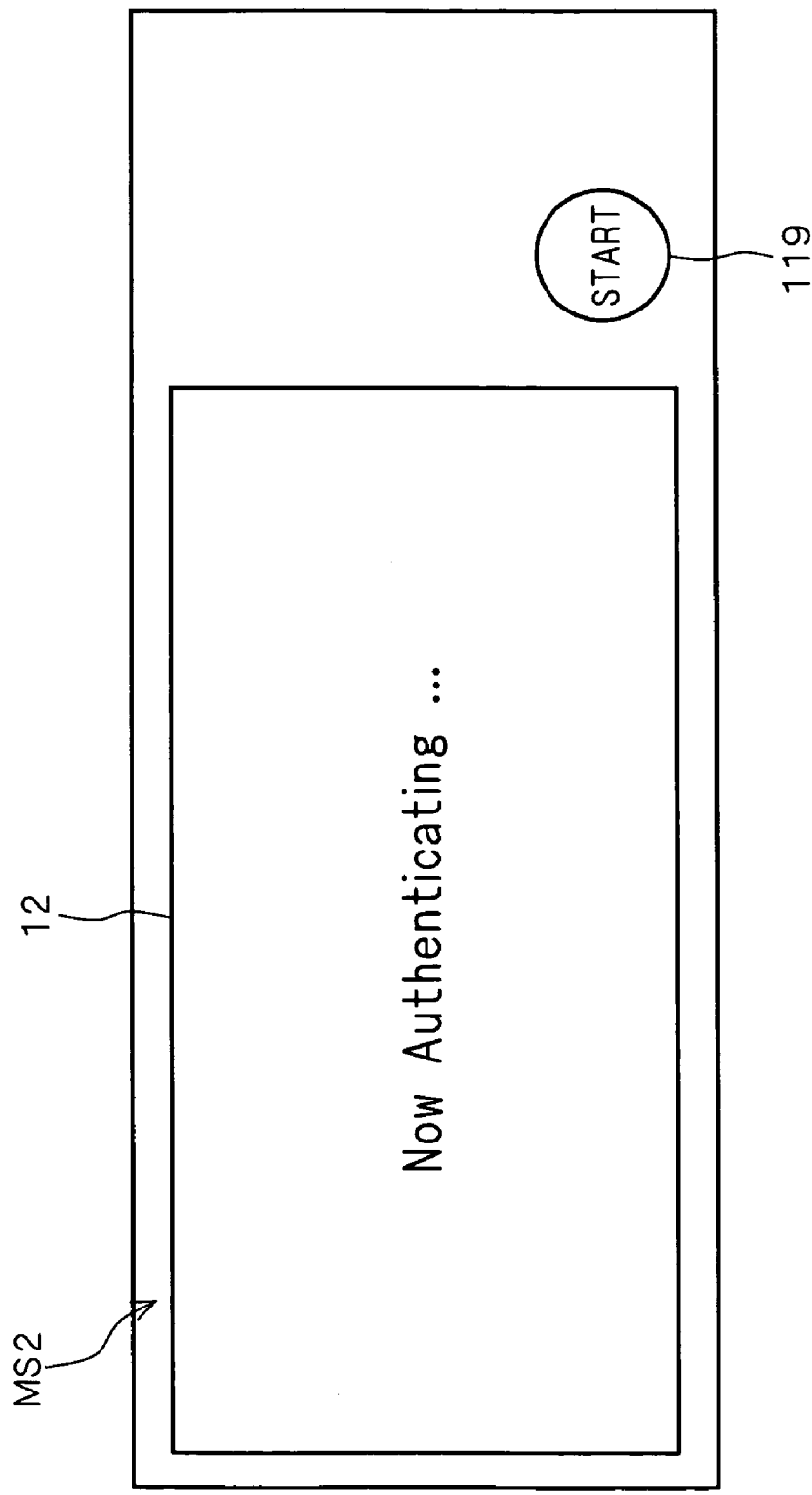
FIG. 13 shows a screen during the user authentication.

After sending the user authentication request in Step S13, the MFP 10 displays a user authenticating screen MS2 (see FIG. 13) on the display 12 (in Step S14) until the MFP 10 verifies that the user authentication result and the like are sent back from the MFP 10 (in Step S15). A message saying "Now Authenticating . . . " or the like appears on the user authenticating screen MS2, as shown in FIG. 13.

After receiving the authentication result and the like, the MFP 10 performs a branching process (in Step S16) in accordance with the authentication result. When the authentication fails, the processing proceeds to Step S17. When the authentication succeeds, the processing proceeds to Step S18.

When the authentication fails, an authentication failure display screen (not shown) indicating that the user authentication fails is displayed on the display 12 for a predetermined period of time (in Step S17). Thereafter, the processing returns to Step S11.

On the other hand, when the authentication succeeds, the MFP 10 displays a box accessible by the user authenticated in the above-mentioned authentication operation on the display 12 in Step S18. Specifically, the MFP permits access to a data file to which any group that the authenticated user belongs to has been granted access, and displays a box in which the data file permitted to be accessed is stored on the display 12.

FIGS. 14 to 20 show display screens MS3 (MS31 to MS37) displayed when the respective users UR1 to UR7 are authenticated. The display screens MS3 are based on the premise that the affiliation information as shown in FIG. 4 is specified.

Figure 16:
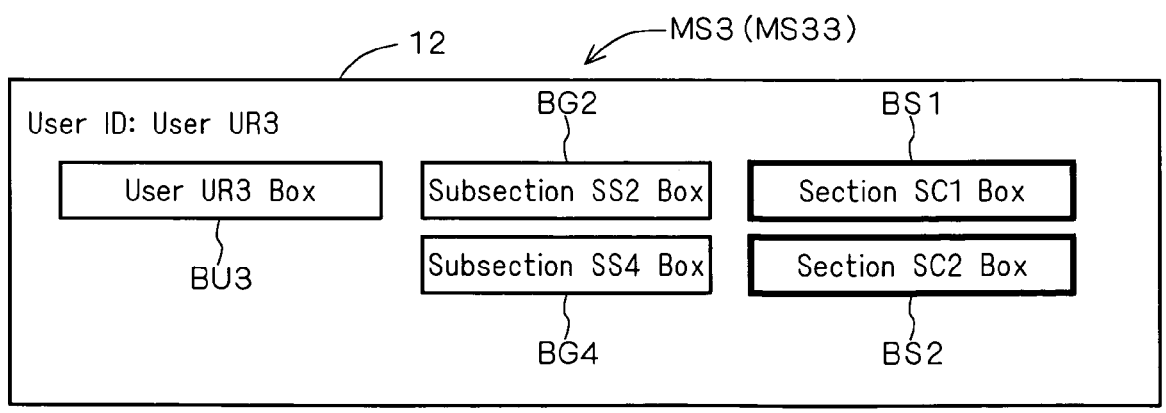

For example, when the user UR3 is authenticated by the above-mentioned authentication operation, the display screen MS33 as shown in FIG. 16 is displayed on the display 12. The display screen MS33 contains a display part BG2 corresponding to the box for the subsection SS2, a display part BG4 corresponding to the box for the subsection SS4, a display part BS1 corresponding to the box for the section SC1 and a display part BS2 corresponding to the box for the section SC2 in addition to a display part BU3 corresponding to the box dedicated to the user UR3.

That is, the MFP 10 selects the boxes accessible by the members of the four groups that the user UR3 belongs to, i.e. the "box for the section SC1," the "box for the section SC2," the "box for the subsection SS2" and the "box for the subsection SS4," as the boxes accessible by the user UR3, to display the names of the boxes on the display 12.

Figure 21:
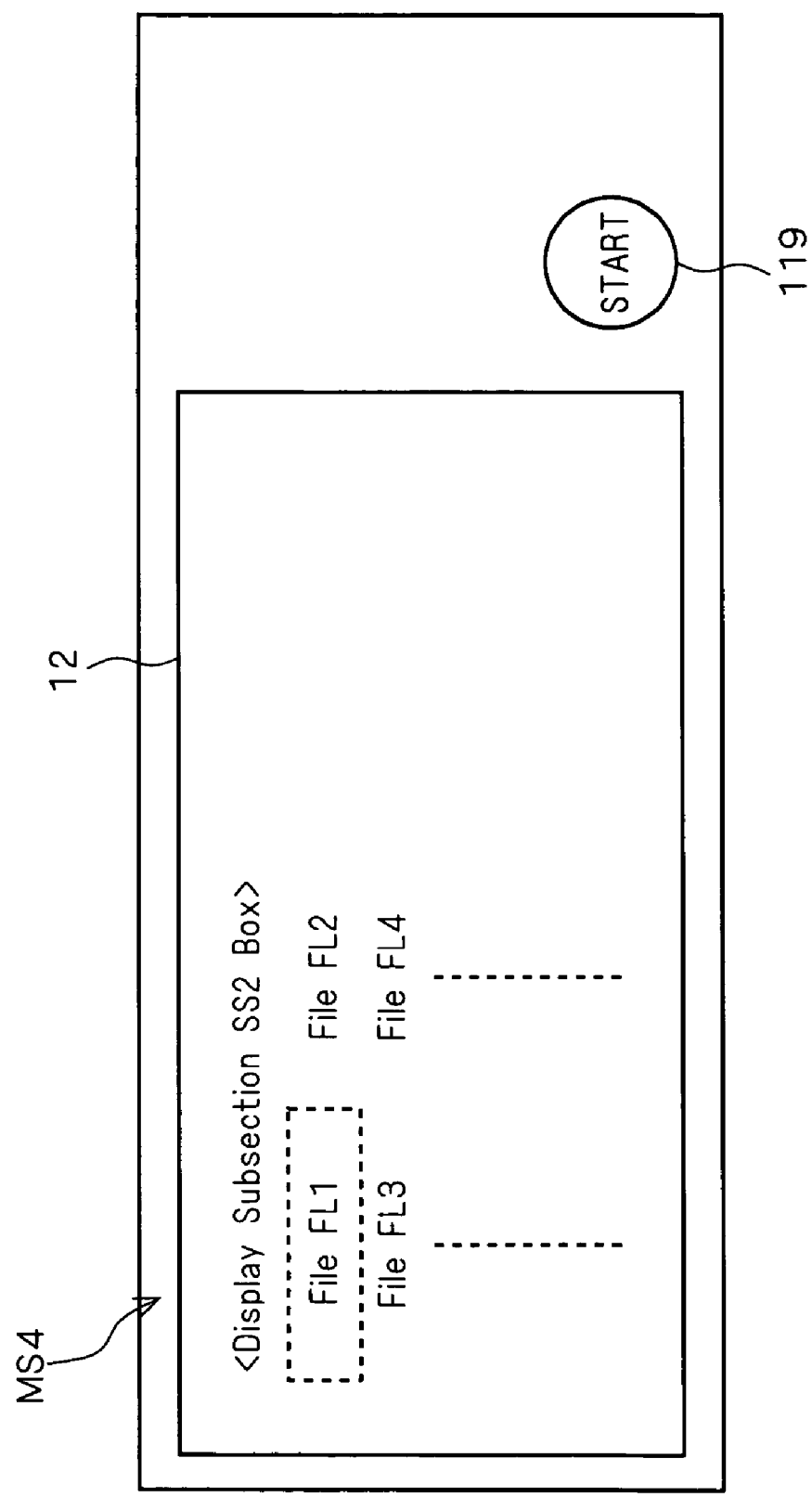
FIG. 21 shows a screen displaying a list of data files.

The operator can display a file within a box corresponding to each of the display parts BU3, BG2, BG4, BS1 and BS2 by pressing each of the display parts BU3, BG2, BG4, BS1 and BS2 with his/her finger. For example, when the operator presses the display part BG2, a list display screen MS4 indicating a list of data files as shown in FIG. 21 appears. The list display screen MS4 contains the names of the files stored in the box for the subsection SS2, specifically files FL1, FL2, FL3, FL4, etc.

Thus, the MFP 10 permits access to data files to which the four groups whose member is the user UR3 have been granted access.

More specifically, the authenticated user UR3 who belongs to the plurality of (herein, two) subsections SS2 and SS4 at the first level is permitted to access the data files to which any of the plurality of subsections SS2 and SS4 has been granted access, that is, the data files within both the "box for the subsection SS2" and the "box for the subsection SS4."

The authenticated user UR3 who belongs to the plurality of (herein, two) sections SC1 and SC2 at the second level is permitted to access the data files to which any of the plurality of sections SC1 and SC2 has been granted access, that is, the data files within both the "box for the section SC1" and the "box for the section SC2."

The authenticated user UR3 who belongs to both the subsections SS2 and SS4 at the first level and the sections SC1 and SC2 at the second level is permitted to access the data files to which any of the plurality of sections SC1 and SC2 at the second level has been granted access in addition to the data files to which any of the plurality of subsections SS2 and SS4 at the first level has been granted access. That is, the authenticated user UR3 is permitted to access the data files within a total of four boxes: the "box for the section SC1," the "box for the section SC2," the "box for the subsection SS2" and the "box for the subsection SS4."

The user UR3 is also permitted to access a data file to which the user has been granted access on a use-by-user basis, for example, a data file within the "box dedicated to the user UR3."

Then, with the files in the box displayed as shown in FIG. 21, the operator can select any of the files by pressing with his/her finger to perform an additional process (e.g., a printing process and the like) on the selected file.

Figure 14:
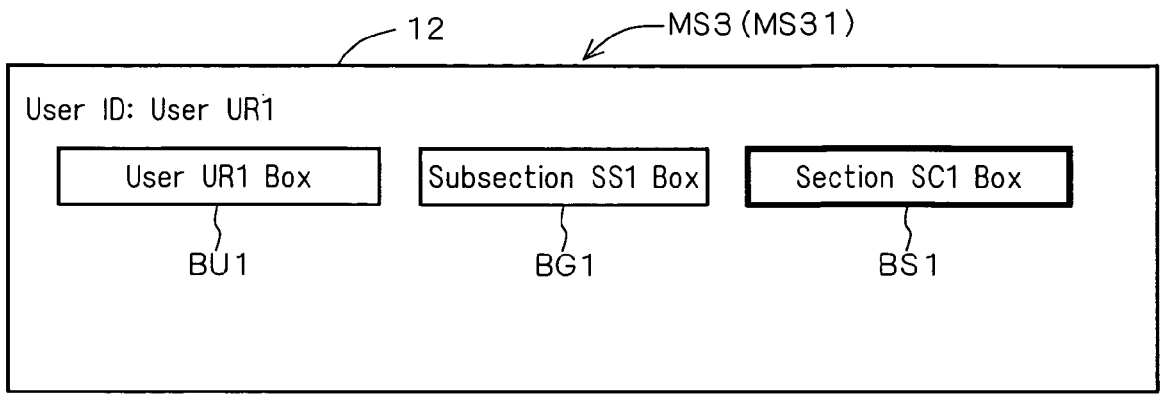
FIGS. 14 through 20 show screens displayed when various users are authenticated.

FIG. 14 shows the display screen MS31 displayed when the user UR1 is authenticated by the above-mentioned authentication operation. The display screen MS31 contains a display part BG1 corresponding to the box for the subsection SS1 and the display part BS1 corresponding to the box for the section SC1 in addition to a display part BU1 corresponding to the box dedicated to the user UR1. The user UR1 can display a file within a box corresponding to each of the display parts BU1, BG1 and BS1 by pressing each of the display parts BU1, BG1 and BS1 with his/her finger.

Figure 15:
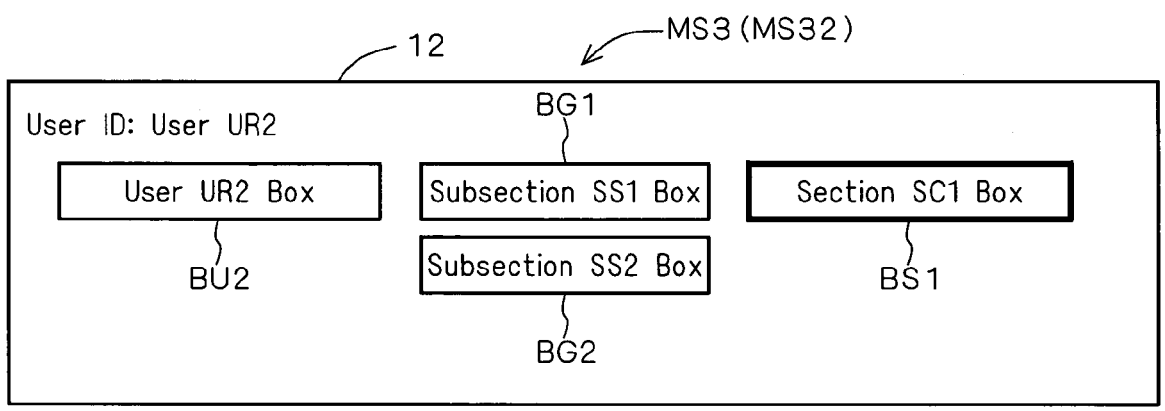

Similarly, FIG. 15 shows the display screen MS32 displayed when the user UR2 is authenticated by the above-mentioned authentication operation. The display screen MS32 shown in FIG. 15 contains the display part BG1 corresponding to the box for the subsection SS1, the display part BG2 corresponding to the box for the subsection SS2 and the display part BS1 corresponding to the box for the section SC1 in addition to a display part BU2 corresponding to the box dedicated to the user UR2. The user UR2 can display a file within a box corresponding to each of the display parts BU1, BG1, BG2 and BS1 by pressing each of the display parts BU1, BG1, BG2 and BS1 with his/her finger.

Figure 19:
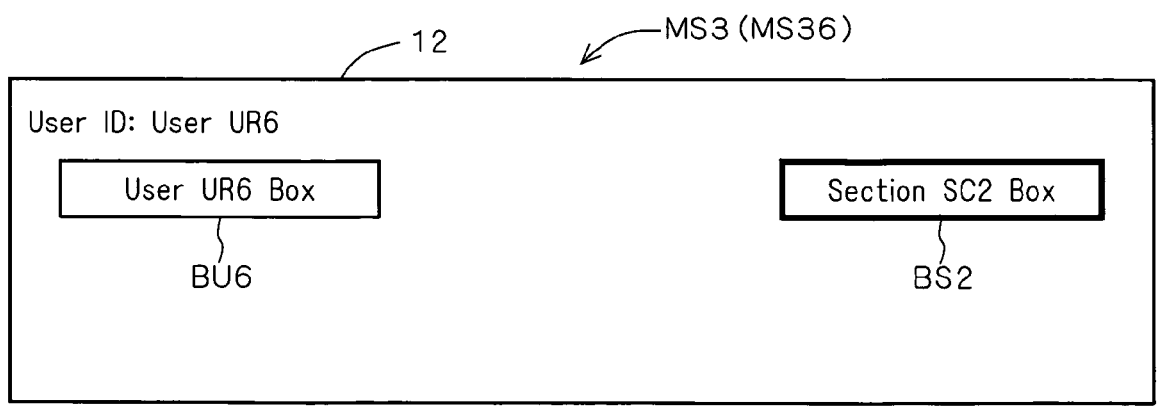

Likewise, FIG. 19 shows the display screen MS36 displayed when the user UR6 is authenticated by the above-mentioned authentication operation. The display screen MS36 shown in FIG. 19 contains the display part BS2 corresponding to the box for the section SC2 in addition to a display part BU6 corresponding to the box dedicated to the user UR6. The user UR6 can display a file within a box corresponding to each of the display parts BU6 and BS2 by pressing each of the display parts BU6 and BS2 with his/her finger. Because the user UR6 belongs to no subsections SS1 to SS5, the display screen MS36 contains no display parts corresponding to the boxes for the subsections SS1 and SS5.

Figure 17:
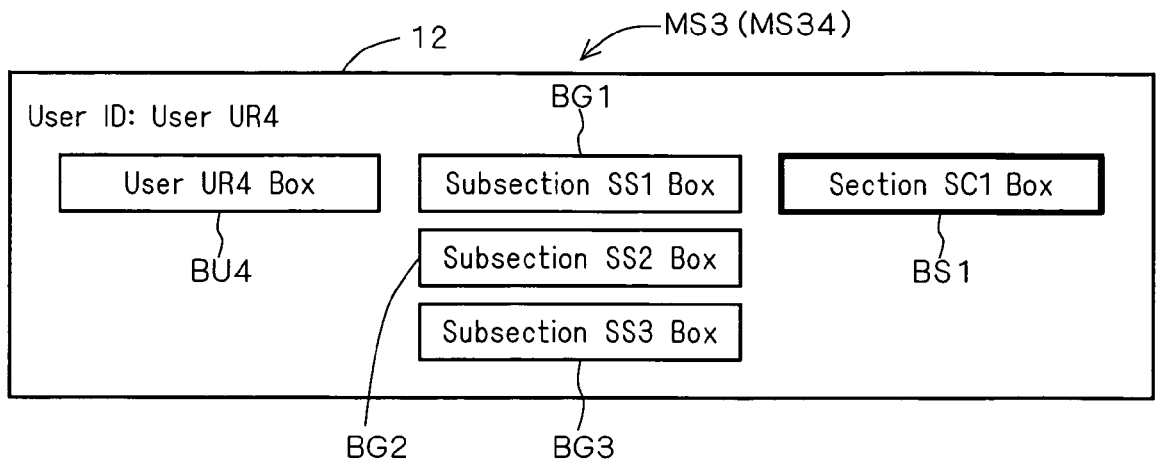
Figure 18:
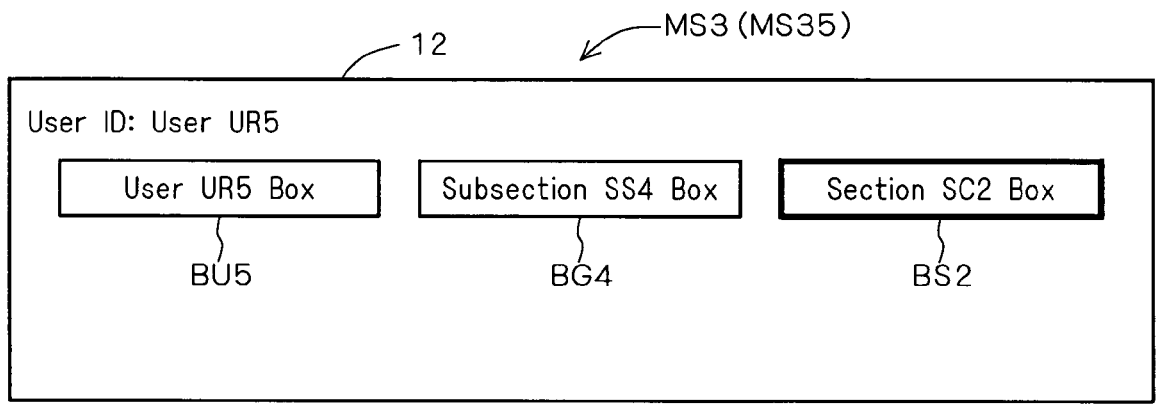
Figure 20:
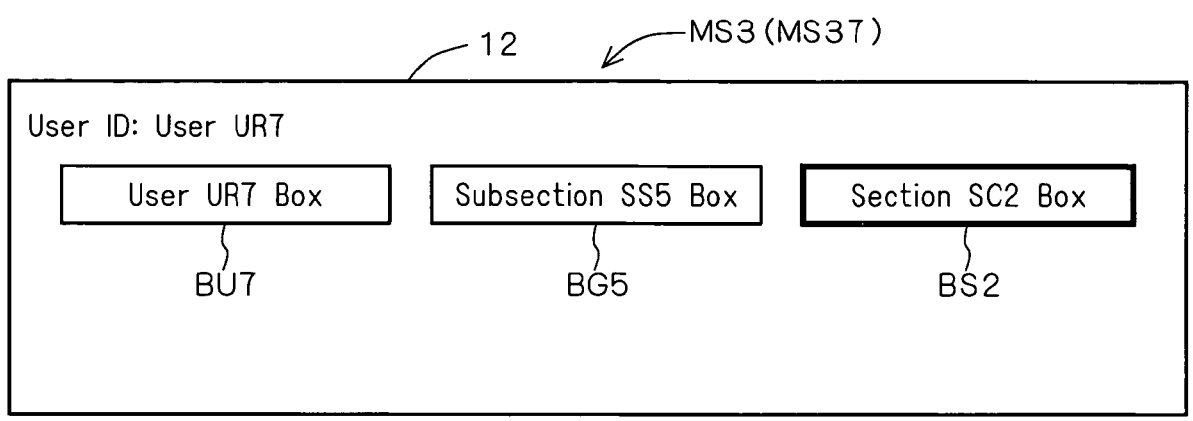

FIGS. 17, 18 and 20 show the display screens displayed when the users UR4, UR5 and UR7, respectively, are similarly authenticated.

In the above-mentioned operation, at least one group that the authenticated user belongs to is identified based on the "affiliation information" in the authentication server 50, and the data management apparatus permits access to a data file to which the at least one group has been granted access. Because, in particular, the plurality of groups that the user belongs to are identified based on the affiliation information in the server and the data management apparatus permits access to data files within the plurality of boxes corresponding to the respective identified groups, only the single operation is required for user authentication when access is made to the plurality of boxes, which is very simple and convenient. In short, the user belonging to the plurality of groups can easily access the plurality of data files because the user need not perform the individual user authentication operations for the plurality of data files to which the different groups that the user belongs to have been granted access. Additionally, the present invention is improved in convenience and easy to access because there is no need for the user to carry an ID card for user authentication and the like.

<A7. Modifications>

Although the operation of modifying the belonging relationship has been mainly described above in relation to the operation of modifying the affiliation information with reference to FIGS. 8 and 9, the present invention is also capable of deleting the groups.

FIG. 22 shows a screen CS6 for deletion of the subsections in the authentication server 50. This screen CS6 is displayed by selection of an item "Delete Subsection" on a predetermined menu screen of the authentication server 50. For example, when the subsection SS5 is selected on the screen CS6, the subsection SS5 is deleted from the groups. In this case, the MFP 10 preferably automatically changes the group that the user UR7 who is a member of the deleted subsection SS5 directly belongs to, from the subsection SS5 to the section SC2 which is the higher-level group that the subsection SS5 belongs to (see FIG. 4). This easily avoids the nonexistence of the group that the user UR7 belongs to if the user UR7 belonging to the subsection SS5 loses the subsection SS5 that the user UR7 directly belongs to.

FIG. 23 shows a display screen MS3 (MS38) appearing on the display 12 when user authentication for the user UR7 is performed again after the above-mentioned deletion operation. FIG. 23 shows that the box for the subsection SS5 is omitted from the display screen MS38.

It is assumed herein that the deletion of the subsection SS5 is accompanied simultaneously by the deletion of the box itself for the subsection SS5. The present invention, however, is not limited to this. The box for the subsection SS5 need not be deleted simultaneously with the deletion of the subsection SS5, but may remain undeleted while being held inaccessible by general users until the system administrator or the like performs the deletion operation.

In the above-mentioned preferred embodiment, one MFP 10 is operated for access to the data files stored in the same MFP 10. The present invention, however, is not limited to this. The above-mentioned concept may be applied to operating one MFP 10 for access to the data files stored in another MFP 10.

Figure 24:
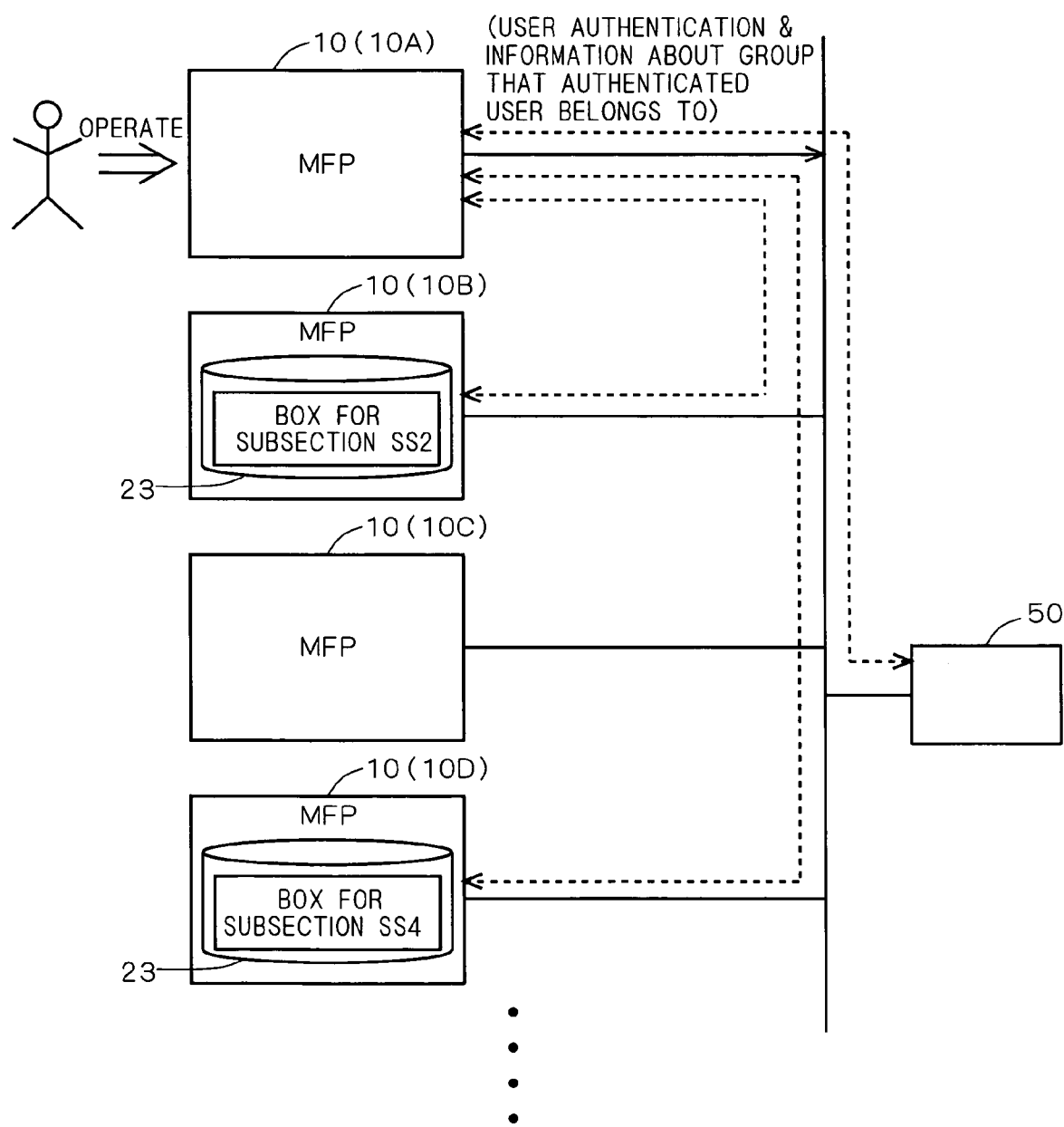
FIG. 24 is a conceptual diagram showing a modification of the present invention.

FIG. 24 is a conceptual diagram showing such a modification of the present invention.

Referring to FIG. 24, the box for the subsection SS2 is provided in the storage part 23 of the MFP 10B, and the box for the subsection SS4 is provided in the storage part 23 of the MFP 10D. When the user UR3 performs the operation similar to that described above on the MFP 10A and succeeds in the user authentication for the user UR3, the MFP 10A may permit the user UR3 not only to access the box dedicated to the user UR3 in the MFP 10A but also to access the boxes provided outside the MFP 10A, i.e. the box for the subsection SS2 in the MFP 10B and the box for the subsection SS4 in the MFP 10D. The MFP 10A can recognize in which MFP each folder is located by communicating with the other MFPs 10B, 10C and 10D.

While the invention has been described in detail, the foregoing description is in all aspects illustrative and not restrictive. It is understood that numerous other modifications and variations can be devised without departing from the scope of the invention.

What is claimed is:

1. A data management system comprising:
an authentication server; and
at least one multifunction peripheral apparatus,
said authentication server including
an affiliation information storage element for storing affiliation information specifying at least one group that each user belongs to,
a server-side authentication element for transferring and receiving data to and from said at least one multifunction peripheral apparatus to perform user authentication, and
a group identification element for identifying one or more groups that a user authenticated by said server-side authentication element belongs to based on said affiliation information to send information about said one or more groups to said at least one multifunction peripheral apparatus,
said at least one multifunction peripheral apparatus including
a data file storage element for storing data files each in association with the right of access of groups to each data file,
an apparatus-side authentication element for transferring and receiving data to and from said authentication server to perform user authentication,
a receiving element for receiving from said authentication server said information about said one or more groups that said authenticated user belongs to, and
an access permission element for granting to said authenticated user access to a data file to which any of said one or more groups that said authenticated user belongs to has been granted access,
wherein said access permission element grants to an authenticated user belonging to a plurality of groups access to a data file to which any of said plurality of groups has been granted access.

2. The data management system according to claim 1, wherein
said data file storage element includes a plurality of boxes provided in corresponding relation to said plurality of groups, respectively, and
a data file stored in a predetermined one of the boxes is regarded as a data file to which a group corresponding to the predetermined box has been granted access.

3. A multifunction peripheral apparatus capable of communication with an authentication server containing affiliation information specifying at least one group that each user belongs to, said multifunction peripheral apparatus comprising:
a data file storage element for storing data files each in association with the right of access of groups to each data file;
an authentication element for transferring and receiving data to and from said authentication server to perform user authentication;
a receiving element for receiving an identification result from said authentication server, said identification result identifying one or more groups that a user authenticated by said authentication element belongs to based on said affiliation information; and an access permission element for granting to said authenticated user access to a data file to which any of said one or more groups has been granted access, wherein said access permission element grants to an authenticated user belonging to a plurality of groups access to a data file to which any of said plurality of groups has been granted access.

4. The multifunction peripheral apparatus according to claim 3, wherein said data file storage element includes a plurality of boxes provided in corresponding relation to said plurality of groups, respectively, and a data file stored in a predetermined one of the boxes is regarded as a data file to which a group corresponding to the predetermined box has been granted access.

5. The multifunction peripheral apparatus according to claim 3, wherein said groups are arranged to form a multilevel hierarchy including first groups at a first level, and second groups at a second level higher than said first level.

6. The multifunction peripheral apparatus according to claim 5, wherein said access permission element grants to an authenticated user belonging to at least two of said first groups at said first level access to a data file to which any of said at least two of said first groups at said first level has been granted access.

7. The multifunction peripheral apparatus according to claim 5, wherein said access permission element grants to an authenticated user belonging to at least two of said second groups at said second level access to a data file to which any of said at least two of said second groups at said second level has been granted access.

8. The multifunction peripheral apparatus according to claim 5, wherein said access permission element grants to an authenticated user belonging to both one of said first groups at said first level and one of said second groups at said second level access to a data file to which said one of said first groups at said first level has been granted access and access to a data file to which said one of said second groups at said second level has been granted access.

9. The multifunction peripheral apparatus according to claim 3, wherein said access permission element grants to said authenticated user access to a data file to which said user has been granted access on a user-by-user basis.

10. A multifunction peripheral apparatus capable of communication with a data storage apparatus storing data files each in association with the right of access of groups to each data file, and capable of communication with an authentication server containing affiliation information specifying at least one group that each user belongs to, said multifunction peripheral apparatus comprising:

an authentication element for transferring and receiving data to and from said authentication server to perform user authentication;

a receiving element for receiving an identification result from said authentication server, said identification result identifying one or more groups that a user authenticated by said authentication element belongs to based on said affiliation information; and an access permission element for granting to said authenticated user access to a data file to which any of said one or more groups has been granted access, wherein said access permission element grants to an authenticated user belonging to a plurality of groups access to a data file to which any of said plurality of groups has been granted access.

11. The multifunction peripheral apparatus according to claim 10, wherein said data files are stored in a plurality of boxes provided in corresponding relation to said plurality of groups, respectively, and a data file stored in a predetermined one of the boxes is regarded as a data file to which a group corresponding to the predetermined box has been granted access.

12. The multifunction peripheral apparatus according to claim 10, wherein said groups are arranged to form a multilevel hierarchy including first groups at a first level, and second groups at a second level higher than said first level.

13. A method of data management, comprising the steps of:
a) storing data files in at least one multifunction peripheral apparatus, each of said data files being stored in association with the right of access of groups to each data file;
b) transferring and receiving data to and from an authentication server to perform user authentication;
c) receiving an identification result from said authentication server, said identification result identifying one or more groups that a user authenticated in said step b) belongs to based on affiliation information, said affiliation information specifying at least one group that each user belongs to, said affiliation information being stored in said authentication server; and
d) granting to said authenticated user access to a data file to which any of said one or more groups that said authenticated user belongs to has been granted access, wherein, in said step d), an authenticated user belonging to a plurality of groups is granted access to a data file to which any of said plurality of groups has been granted access.

14. The method according to claim 13, wherein
said data files are stored in a plurality of boxes provided in corresponding relation to said plurality of groups, respectively, and a data file stored in a predetermined one of the boxes is regarded as a data file to which a group corresponding to the predetermined box has been granted access.

15. The method according to claim 13, wherein
said groups are arranged to form a multilevel hierarchy including first groups at a first level, and second groups at a second level higher than said first level.

* * * * *